March 17, 1970  A. V. MARTIN  3,501,697
REVERSIBLE METER FOR DISPLAYING DIRECT AND RECIPROCAL
CONTROL INFORMATION
Filed Aug. 28, 1967
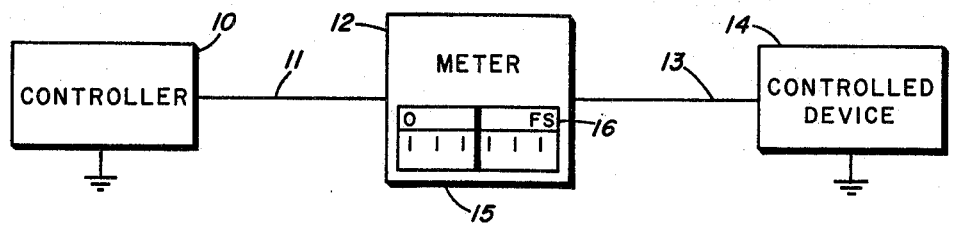
FIG. 1
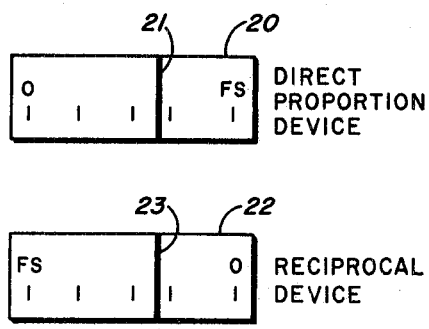
FIG. 2 (PRIOR ART)
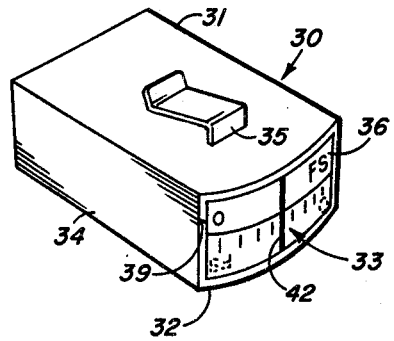
FIG. 3
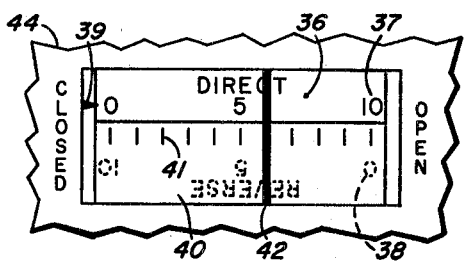
FIG. 4
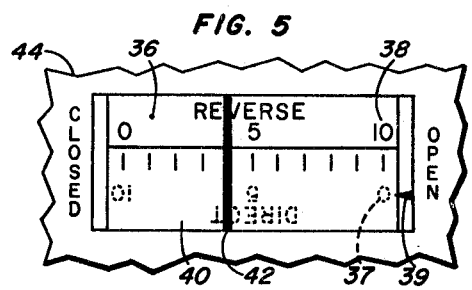
FIG. 5
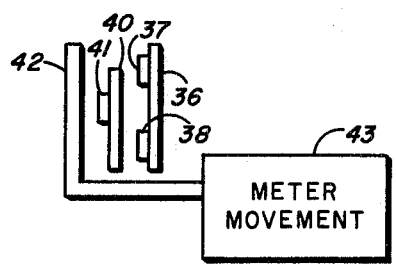
FIG. 6
FIG. 7
INVENTOR.
ALBERT V. MARTIN
BY Mueller, Aichele & Raimer
ATTORNEYS

United States Patent Office 3,501,697
Patented Mar. 17, 1970

3,501,697
REVERSIBLE METER FOR DISPLAYING DIRECT AND RECIPROCAL CONTROL INFORMATION
Albert V. Martin, Scottsdale, Ariz., assignor to Motorola, Inc., Franklin Park, Ill., a corporation of Illinois
Filed Aug. 28, 1967, Ser. No. 663,787
Int. Cl. G01r 1/08; G09f 9/00
U.S. Cl. 324—115                                    4 Claims

ABSTRACT OF THE DISCLOSURE

A meter having a meter face with an indicating needle. A pair of oppositely-extending scale indicia on the meter face with shutter means movable to selectively cover one of the two sets of indicia such that a linear and a reciprocal (reverse) scales are selectively provided. By turning the meter rightside up or upside down and selecting its proper scale, the indicating needle always moves from left to right respectively to indicate zero and full scale of a controlled device response respectively in a direct and reciprocal proportion to control signals.

BACKGROUND OF THE INVENTION

This invention relates to electrically actuated meters preferably of the type that are mounted in panels and more particularly to a meter which is capable of indicating a reciprocal or a direct proportion of an electrical signal wherein the indication always reads from zero to full scale in the same direction.

In process control systems there are two classes of controlled devices, such as valves. A first class is fully actuated when a maximum current amplitude or voltage is applied thereto. Such devices may be termed directly proportional devices in that the actuation is in proportion to the supplied control signal. In certain situation it is desired that when a full amplitude actuating signal is provided that the controlled device be deactivated. Such devices may be called reciprocal (reverse) proportional devices. For an example, a spring loaded valve may be constructed such that with no electrical current supplied thereto it is fully open. As current is supplied to the valve, it tends to close in proportion to the supplied current. For purposes of discussion, reciprocal device will be considered as "actuated" when no central signal is being supplied. The term "actuated" being related to the process being controlled in that maximum operation is being provided by the device with respect to the process.

In process control systems, an indicating meter is electrically interposed between the controller, either manual or automatic, and the controlled device for indicating to a monitoring operator the status of the actuating signal supplied from the controller to the controlled device. In manufacturing meters wherein the meter movement is responsive to the current amplitude flowing therethrough, the movement of the meter indicator for a directly proportional device will be from left to right in moving from zero current amplitude to full-scale current amplitude. However, when a reciprocal operated device is utilized, the full scale has been placed on the left-hand side. Therefore, the indicating needle moves from the right toward the left and the observing operator must be alert to the fact that various meters indicate different status of controlled devices, i.e., fully actuated or deactivated.

SUMMARY OF THE INVENTION

It is an object of the present invention to provide the universal indicating meter wherein it can indicate actuation of a controlled device of either a directly proportional or reciprocal (reverse) type wherein the meter indication is always zero or deactivated on the left-hand side and at full scale or fully actuated on the right-hand side.

A feature of the present invention is the provision in the meter of a shutter member placed between the indicating needle and an indicia support member which covers one of two sets of indicia depending upon the related position of the members, one with respect to the other. Either member may be movable to provide the selection of indicia sets. When the meter is in the first orientation, the scale and needle combination will indicate actuation of a directly proportional device. By turning the meter over, i.e., reversing its orientation, the reciprocal or reverse will be indicated while maintaining needle movement from a closed or deactivated status on the left-hand side with a fully activated status on the right-hand side. A monitoring operator, when viewing such meters, will always know that the needle being at the right-hand portion of the meter face always indicates that the controlled device is fully actuated causing a function to be performed at a maximum in the process and when the needle is on the left-hand side, he will know that the controlled device is deactivated causing a function to be at a minimum irrespective of whether it is a directly proportional or reciprocal device. Such provision simplifies training of operators and avoids operator errors in process control systems.

THE DRAWING

FIG. 1 is the block diagram of a system utilizing the teachings of the present invention.

FIG. 2 is a diagrammatic showing of prior art meters.

FIG. 3 is a perspective view of a meter incorporating the teachings of the present invention.

FIG. 4 is an enlarged schematic front view of the FIG. 3 meters where in the meter is in a first orientation for use with a directly proportional controlled device.

FIG. 5 is a view similar to FIG. 4 wherein the meter of FIG. 3 is used with a reciprocal type device.

FIG. 6 is a diagrammatic view showing the relationship of the meter face shutter, the meter face, and indicating needle.

FIG. 7 is a partial diagrammatic view of a second embodiment of the present invention.

DESCRIPTION OF THE ILLUSTRATIVE EMBODIMENTS

Referring first to FIG. 1, there is shown a controller 10 providing control signals in a usual manner over line 11 through meter 12 and thence over line 13 to controlled device 14. Controller 10 may be either a manually actuated or automatically actuated device of a type which supplies a current amplitude indication of a control function to be performed. The controlled device 14, for example, may consist of a valve used to control flow of a fluid in a process (not shown). In some instances controlled device 14 may be responsive in a direct proportion to the amplitude of current supplied by controller 10. That is, when maximum current is being supplied over line 13 to device 14, the valve, for example, will be fully actuated or open. In such an instance, meter 12 has its indicating needle 15 disposed in front of meter face 16 on the right-hand end indicating full scale or full actuation.

In the alternative case, controlled device 14 may be of the reciprocal proportional type. That is, when zero current amplitude is being supplied over line 13, controlled device 14 is fully actuated, such as a spring actuated valve which is normally open. In such an instance, meter 12 should indicate to the operator that the device is fully actuated, requiring that needle 15 be at the full-scale indication on the left-hand portion of meter face 16. In controlling or monitoring a process, an operator must bear in mind which end, left or right, of the various meters indicates maximum function performance in the process being monitored.

Referring next to FIG. 2, there is shown a prior art type of meter face. Meter face 20 is usable with direct proportion devices with the meter movement (not shown) positioning indicating needle 21 between the left-hand or zero end of meter face 20 to the full scale or right-hand end to indicate when the controlled device such as device 14 is fully actuated. Meter 12, as shown in FIG. 1, will provide the left-to-right-hand movement due to the meter movements of known design and construction already providing movements from left to right in accordance with the current flowing over lines 11 and 13. However, when device 14 is a reciprocal device, then a meter face 22 is provided having a zero or reference point on the right-hand end and a full scale indication, FS, at the left-hand end portion. Assume that the current amplitude flowing from meter 12 is identical in both illustrations, that is, for meter faces 20 and 22, to move needles 21 and 23, respectively, as shown. In the direct proportion illustration, needle 21 is in the right-hand end portion just below full actuation indication. Contrariwise, on meter face 22, needle 23, having an identical movement in meter 12 with respect to meter face 20, is in the same position. However, the scale indication is reversed in that the controlled device, being a reciprocal device, is close to being fully deactivated insofar as the process is concerned. In looking at meter faces 20 and 22, any operator has to remain continually alert to the fact that the meter indications are reversed one from the other whenever controlled devices of the direct proportion class and reciprocal class are used in the same process controlled system. The utilization of both classes of devices in the same system is quite possible to the safety and emergency requirements of system design known to the industry.

Referring now to FIGS. 3 through 6, there is shown a meter construction which obviates the above possible source of errors in a process control system due to operator misinterpretation of a meter indication. In these figures like numbers denote like parts and structural features. FIG. 3 shows a universal meter 30 having an upper wall 31 and a lower wall 32, with a curved meter face 33 disposed between the upper and lower walls 31, 32 at one end of the meter housing generally denoted 34. A spring type catch 35 of any design may be placed on the wall 31 as shown for retaining meter 30 in a panel 44. Other support means (not shown) may be substituted for spring type catch 35. Meter face 33 includes a scale or indicia support member 36 having two sets of indicia 37 and 38 affixed thereon (such as by printing) on the same major face of member 36. Indicia set 37 is used when the meter is connected to a direct proportion device being controlled. Such indicia may be identified by a caret mark 39 which will clearly indicate to an installer the proper orientation of meter 30. It should be noted that indicia set 37 has a zero indication adjacent caret mark 39 with the full scale indication on indicia support 36 opposite from said mark 39. Indicia set 38 is oppositely disposed on indicia support 36 and extends in opposing direction thereon with respect to mark 39 as best seen in FIGS. 4 and 5. Also, the two indicia sets are disposed on support 36 such that they are upside down, one with respect to the other. Therefore, when the meter 30 is reversed in its orientation by being turned upside down, the selected indicia set 37 or 38 will be right side up for reading by an operator.

To ensure that there is no confusion between the two indicia sets, a slidable shutter 40, having a set of graduation marks 41 thereon, is disposed in front of meter support 36 but behind indicating needle 42 which is connected to and moved by meter movement 43. Shutter 40 is slidably mounted between walls 31 and 32 for movement between said walls. When the meter 30 is in the position shown on FIG. 4, shutter 40 has slid down over the lower portion of indicia support 36 to cover indicia set 38 and expose indicia set 37 to the operator. When the meter 30 is reversed by turning it upside down as shown in FIG. 5, and indicated by reference mark 39, shutter 40 slid downwardly to cover indicia set 37 and expose indicia set 38. Needle 42 in FIGS. 4 and 5 is drawn such that it is positioned with the same amplitude current that would be found flowing through meter 12 of FIG. 1.

In FIG. 4, needle 42 is approximately 60% from the "closed" side of meter receptacle in panel 44 to indicate that a direct proportion controlled device 14 is 60% open, for example. By merely turning the meter 30 over and reinserting it into the panel 44 meter receptacle, the "closed" indication remains in the left-hand side as seen in FIG. 5. A reciprocal controlled device 14, with the same current amplitude flowing over line 13 of FIG. 1, should be 40% open as correctly indicated by needle 42 in FIG. 5. As shown, the "closed" and "open" indications on panel 44 can be stenciled or otherwise fixed to panel 44 without regard to the type of control device to be utilized with a control point in a process controlled system. Such flexibility facilitates the fabrication of monitoring and control panels for use in process controlled systems and reduces the cost thereof.

Referring next to FIG. 7 there is illustrated in diagrammatic form another meter incorporating the teachings of the present invention. A meter movement (not shown), of the usual type, moves needle 54 across the illustrated arcuate scale. The meter face 59 has a plurality of apertures 51 aligned with certain graduation marks 57 for selectively exposing the indicia sets 55 and 56. At this respect face 59 serves as a stationary shutter. The indicia sets are mounted on an arcuate shaped slide 52 movably held in guide 53 and positioned under meter face 59 such that the indicia sets may be selectively positioned at the apertures in exposed position by moving slide 52 to the left or right. To this end, slide button 58 is movably disposed in slot 60 for permitting an operator to move the slide number for selecting the indicia set.

As shown, a reverse or reciprocal indication is provided by moving button 58 to the left exposing indicia set with the meter positioned upside down. Returning the meter to its right side up position and moving button 58 to the right as seen in FIG. 7, a direct reading meter is provided.

It is seen therefore that the same capabilities can be supplied to any meter irrespective of the meter scale configuration and the indicator needle movement. Such a meter has two sets of indicia selectively exposable to an operator's view with some form of relative movement between the indicia set holding member and the shutter member for selectively exposing one of the two indicia sets. Indicia sets have to be upside down, one in respect to the other, to insure that the meter is positioned correctly.

I claim:
1. In a universal indicating meter having a meter movement with a movable indicating needle, said meter being adapted for use in either an upright or an inverted position, the improvement comprising
    (a) an indicia support member having first and second indicia sets respectively extending in opposing directions and being upside down with respect to the other, said support member being fixedly mounted on said meter;
    (b) a shutter member interposed between said indicia support member and the indicating needle, said shutter member being movably mounted on said meter to cause vertical movement thereof between first and second positions when said meter is moved from said upright to inverted positions, said shutter member being mounted to continually shield a portion of said indicia support member, said shutter member covering one of said indicia sets, the other of said indicia sets being exposed to view.

2. The invention of claim 1 further including means on one of said members indicating which indicia set is exposed to view.

3. The invention of claim 1 wherein said shutter member has graduation markings thereon usable with both indicia sets.

4. The invention of claim 1 further including panel means mounting said meter and including permanent deactuated indicating means adjacent the left-hand side of said member and actuated indicating means adjacent the right-hand side of said member.

References Cited

UNITED STATES PATENTS

| | | | |
|---|---|---|---|
| 1,958,282 | 5/1934 | Tregenza | 324—115 |
| 3,092,072 | 6/1963 | Strimel | 324—115 XR |
| 2,112,516 | 3/1938 | Browne | 324—115 |
| 3,209,257 | 9/1965 | Miller | 324—115 |

FOREIGN PATENTS 117,373   4/1930   Austria.

RUDOLPH V. ROLINEC, Primary Examiner

ERNEST F. KARLSEN, Assistant Examiner

U.S. Cl. X.R.

73—431; 116—129; 324—156